US011948004B1

(12) United States Patent
Padmanabhan et al.

(10) Patent No.: US 11,948,004 B1
(45) Date of Patent: Apr. 2, 2024

(54) ENHANCED TRANSFERRING OF AN APPLICATION BETWEEN A SERVER ENVIRONMENT AND A LOCAL DEVICE

(71) Applicant: Microsoft Technology Licensing, LLC, Redmond, WA (US)

(72) Inventors: Prasanna Chromepet Padmanabhan, Redmond, WA (US); Zachary Dixon, Redmond, WA (US); Jinhua Fei, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/124,654

(22) Filed: Mar. 22, 2023

(51) Int. Cl.
*G06F 9/50* (2006.01)
*G06F 16/955* (2019.01)
*H04L 67/141* (2022.01)

(52) U.S. Cl.
CPC .............. *G06F 9/50* (2013.01); *G06F 9/505* (2013.01); *G06F 16/9566* (2019.01); *H04L 67/141* (2013.01)

(58) Field of Classification Search
CPC ....... H04L 67/02; H04L 67/141; G06F 9/452; G06F 16/9566
See application file for complete search history.

(56) References Cited

U.S. PATENT DOCUMENTS

| | | | | |
|---|---|---|---|---|
| 8,972,485 B1* | 3/2015 | French | ................. | G06F 9/5044 709/203 |
| 10,776,236 B1* | 9/2020 | Kudrin | ................. | H04L 67/025 |
| 10,924,528 B1* | 2/2021 | Korobov | ............... | G06F 16/178 |
| 2004/0003029 A1* | 1/2004 | Islam | ...................... | G06F 9/505 709/203 |
| 2008/0184340 A1* | 7/2008 | Nakamura | .............. | H04L 67/56 726/3 |
| 2010/0070972 A1* | 3/2010 | Kumagai | ................ | H04L 69/32 718/1 |
| 2018/0095741 A1* | 4/2018 | Tanabe | .................... | H04L 67/34 |
| 2019/0243920 A1* | 8/2019 | Pollock | ................ | H04L 67/133 |
| 2022/0038453 A1* | 2/2022 | Chauhan | ............... | G06F 21/128 |
| 2022/0237044 A1* | 7/2022 | Shah | ....................... | G06F 9/505 |
| 2023/0195507 A1* | 6/2023 | Qiao | ......................... | G06F 9/48 718/102 |
| 2023/0195824 A1* | 6/2023 | Qiao | ..................... | G06F 16/957 709/201 |

OTHER PUBLICATIONS

Lohr, et al., "Use Microsoft Teams on Azure Virtual Desktop", Retrieved from: https://learn.microsoft.com/en-us/azure/virtual-desktop/teams-on-avd, Sep. 28, 2022, 8 Pages.

* cited by examiner

*Primary Examiner* — Asher D Kells

(57) ABSTRACT

Methods and systems for transferring an application between a server environment and a local device are provided. Some examples include launching the application in the server environment. The application is associated with a URL. Some examples further include determining that the application should be executed on the local device, generating a transfer control option corresponding to switching the application from the server environment to the local device, receiving a selection of the transfer control option, and in response to receiving the selection, transmitting the URL from the server environment to the local device to enable execution of the application on the local device.

20 Claims, 10 Drawing Sheets

ENHANCED TRANSFERRING OF AN APPLICATION BETWEEN A SERVER ENVIRONMENT AND A LOCAL DEVICE

BACKGROUND

Sometimes software applications are executed in a server environment, such as on a virtual machine. For example, a videoconferencing application may be executed on a virtual machine. However, there may be disadvantages to executing software applications, such as a video conferencing application, on a virtual machine. For instance, virtual machines can lack several hardware components, such as a camera, microphone, etc. Further, executing applications on virtual machines can create high processing usage on the virtual machine, due to, for example, unnecessary decoding and reencoding of a video stream, which reduces computational performance of running the applications.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to methods, systems, and media for transferring an application between a server environment and a local device. The application may be launched in the server environment, and it may be determined that the application may be executed on the local device. A uniform resource locator (URL) corresponding to the application may be transmitted from the server device to the local device, to enable execution of the application on the local device, based on the URL.

In some examples, a method for transferring an application between a server environment and a local device is provided. The method includes launching the application in the server environment. The application is associated with a URL. The method further includes determining that the application should be executed on the local device, generating a transfer control option corresponding to switching the application from the server environment to the local device, receiving a selection of the transfer control option, and in response to receiving the selection, transmitting the URL from the server environment to the local device to enable execution of the application on the local device.

In some examples, the server environment is a remote desktop session on a virtual machine.

In some examples, the URL is transmitted from the server environment to the local device, via a dynamic virtual channel.

In some examples, the determining includes receiving a key indicating that the application is capable of launching on the local device.

In some examples, the application is a videoconferencing application.

In some examples, the transfer control option is a button, and wherein the selection corresponds to a selection of the button.

In some examples, when the application is launching in the server environment, the application is being launched by a first processor, and when the application is executed on the local device, the application is being executed by a second processor.

In some examples, a system for transferring an application between a server environment and local device is provided. The system includes a server device that includes a processor, and memory storing instructions that when executed by the processor cause the system to perform a set of operations. The set of operations include launching the application in the server environment. The application is associated with a URL. The set of operations further include determining that the application should be executed on a local device, generating a transfer control option corresponding to switching the application from the server environment to the local device, receiving a selection of the transfer control option, and in response to receiving the selection, transmitting the URL from the server environment to the local device to enable execution of the application on the local device.

In some examples, a method for transferring an application between a server environment and a local device is provided. The method includes executing the application in the server environment. The application is associated with a URL. The method further includes determining that a usage level of the application exceeds a predetermined threshold, determining that the application may be executed on the local device based on the application being associated with the URL, generating a transfer control option corresponding to switching the application from the server environment to the local device, and transmitting the URL from the server device to the local device, based on the generated indication, via a dynamic virtual channel, to enable execution of the application on the local device.

In some examples, the usage level corresponds to at least one of a memory usage level or a processor usage level.

In some examples, the application is a browser application.

In some examples, the transfer control option is a button, and the method further comprises receiving a selection of the button, the transmitting being in response to receiving the selection.

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
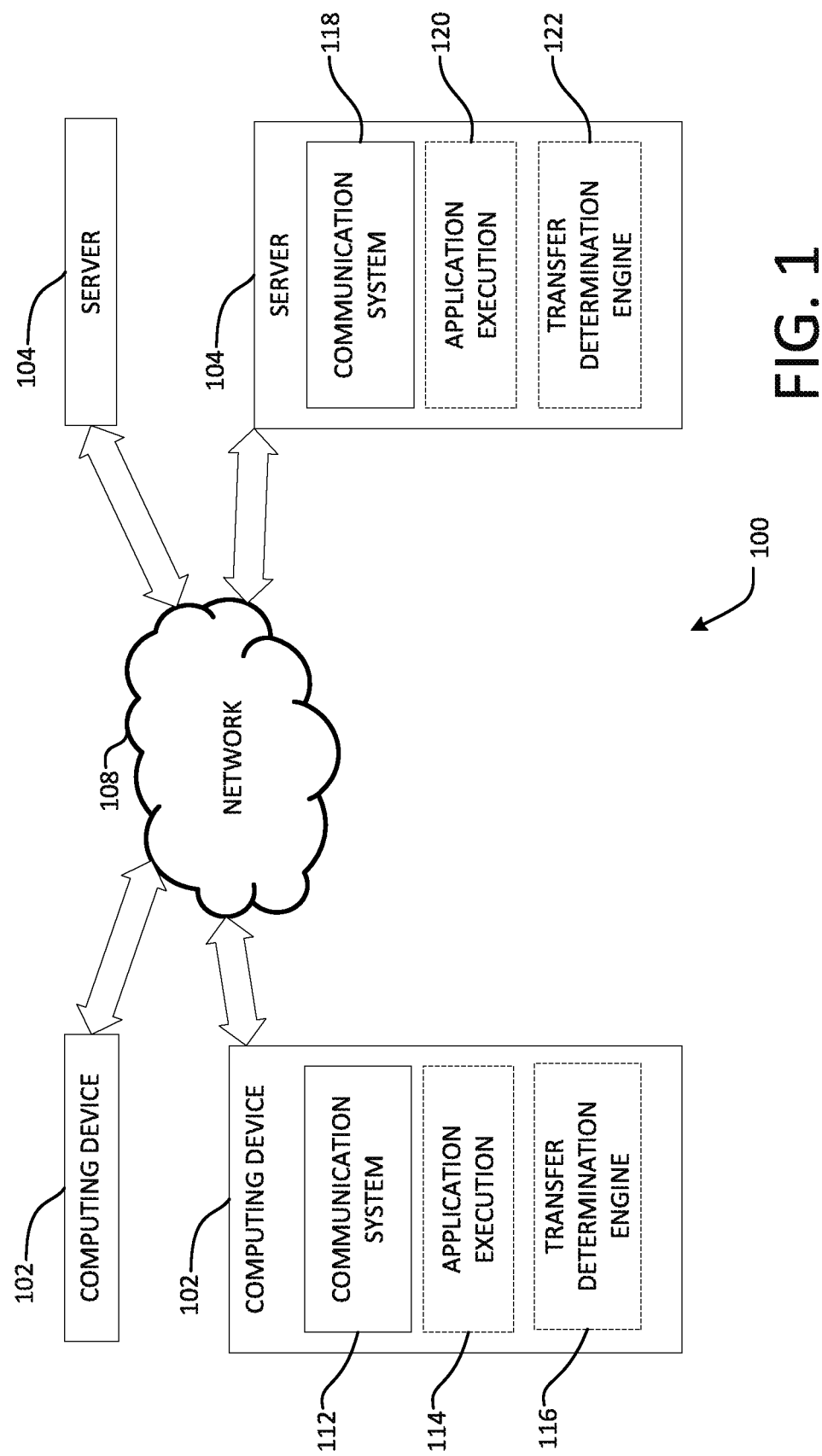
FIG. 1 illustrates an overview of an example system according to some aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As mentioned above, sometimes software applications are executed in a server environment, such as on a virtual machine. For example, a videoconferencing application may be executed on a virtual machine. However, there may be disadvantages to executing software applications, such as a video conferencing application, on a virtual machine. For instance, virtual machines lack several hardware components, such as a camera, microphone, etc. Further, executing applications on a virtual machine can create high processing usage on the virtual machine, due to, for example, unnecessary decoding and reencoding of a video stream, which reduces computational performance of running the applications.

Still further, server devices (e.g., that include a virtual machine) may not have a graphics processing unit (GPU) attached, which means that the server device is likely to have relatively inefficient software decoders and/or encoders. However, a client or local device is likely to have some form of hardware decoding and/or encoding available. For example, in some examples the client device may have a discrete or integrated GPU which can run encoding and/or decoding operations. Therefore, executing operations (e.g., encoding, decoding, and/or other operations) may be more efficiently executed on a device, such as a client device, that has a GPU (e.g., as opposed to only a central processing unit (CPU), without a GPU).

To improve computational performance of running a software application, a user may choose to cancel or exit the software application on the server environment, and open or execute the software application on a local device. However, such a process of closing an application on a first device and having to navigate to and open the application on a second device is time-consuming and may reduce a user's experience and/or efficiency. Further, in some examples, since a user's experience may be reduced by having to take several steps to transfer an application to a local device, they may instead choose to continue running the application in the server environment, which can be computationally inefficient (e.g., requiring a relatively large amount of processing power and memory). As such, there exists a need to provide enhanced fluidity in transferring execution of an application between a server environment and a local device, to improve computational performance of running the application.

Accordingly, some aspects of the present disclosure relate to methods and systems for transferring an application between a server environment and a local device. Generally, applications described herein for server environments are associated with a uniform resource indicator, such as a uniform resource locator (URL), and contain computer readable instructions that may be executed by at least one processor to perform specified operations. The application can be launched in a server environment. The server environment is associated with the server device and the local device. For example, the server environment may be a virtual machine and/or a virtual desktop for the local device, the virtual machine and/or virtual desktop being executed on the server device. The application may be a videoconferencing application, a video-playing application, a music application, and/or a web browser application. Those skilled in the art will appreciate that other applications may also benefit from the concepts described herein, such as applications that use a relatively significant amount of computational resources when performing their specified operations.

Mechanisms described herein may determine that the application may be executed on the local device (e.g., based on the application being associated with the URL). In response to detecting that the application may be executed on the local device, a transfer control option (e.g., a button on a graphical user-interface) is generated that corresponds to switching the application from the server environment to the local device. A selection of the transfer control option is received (e.g., via a user-input, such as a key-press, a mouse click, a vocal command, a gaze command). In response to receiving the selection, the URL is transmitted from the server environment to the local device to enable execution of the application on the local device.

In some examples, when the application is executing in the server environment, a usage level of the application may be determined and compared to a predetermined threshold. For example, the usage level may correspond to at least one of a memory usage level or a processor usage level, as will be discussed further herein.

Advantages of mechanisms disclosed herein may include an improved user efficiency for fluidly transferring an application from a server environment to a local device. Further, mechanisms disclosed herein for transferring an application between a server environment and a local device can improve computational efficiency, by offloading tasks that are relatively computationally intensive (e.g., requiring a large amount of processing power and/or memory) onto a local device.

Referring specifically to videoconferencing applications, which are discussed with respect to some examples provided herein, a system that includes a server environment may be required to decode a video stream, reencode the video stream, have a web client decode the video stream again, and then reencode the video stream again to send it back to a local client. Comparatively, when a videoconferencing application is transferred to a local device, the video stream may only have to be decoded and/or reencoded a single time, such as by a web browser application and/or by a local client application.

FIG. 1 shows an example of a system 100, in accordance with some aspects of the disclosed subject matter. The system 100 may be a system for transferring an application between a server environment and a local device. The system 100 includes one or more computing devices 102, one or more servers 104, and a communication network or network 108.

Computing device 102 may include a communication system 112, an application execution engine or component 114, and/or a transfer determination engine or component 116. In some examples, computing device 102 can execute at least a portion of the application execution component 114 to execute a software application, such as a videoconferencing application, a teleconferencing application, a video streaming application, a web-browsing application, etc.

Further, in some examples, computing device 102 can execute at least a portion of the transfer determination component 116 to determine whether the application being executed by the application execution component 114 should be transferred to another device (e.g., from the server 104 to the computing device 102, or vice-versa). In some examples, the transfer determination component 116 may determine a computational bandwidth associated with an application that is being executed, and the computational bandwidth may be compared to a computational capacity associated with a device on which the application is running, or a predetermined computational threshold. Additionally, or alternatively, in some examples the transfer determination component 116 may detect whether an application is running in a server environment, such that in response to the detection, it may be determined that the application should be transferred.

Server device 104 may include a communication system 118, an application execution engine or component 120, and/or a transfer determination engine or component 122. In some examples, server device 104 can execute at least a portion of the application execution component 120 to execute a software application, such as a videoconferencing application, a teleconferencing application, a video streaming application, a web-browsing application, etc.

Further, in some examples, server device 104 can execute at least a portion of the transfer determination component 122 to determine whether the application being executed by the application execution component 120 should be transferred to another device (e.g., from the server 104 to the computing device 102, or vice-versa). In some examples, the transfer determination component 122 may determine a computational bandwidth associated with an application that is being executed, and the computational bandwidth may be compared to a computational capacity associated with a device on which the application is running, or a predetermined computational threshold. Additionally, or alternatively, in some examples the transfer determination component 122 may detect whether an application is running in a server environment, such that in response to the detection, it may be determined that the application should be transferred.

Additionally, or alternatively, in some examples, computing device 102 can communicate with the server 104 over a communication network 108. In some examples, the network 108 can execute at least a portion of the application execution component 114 and/or the transfer determination component 116. In some examples, the application execution component 114 may execute one or more portions of methods/processes 400 and/or 600 described below in connection with FIGS. 4 and 6, respectively. Further in some examples, the transfer determination component 116 may execute one or more portions of methods/processes 400 and/or 600 described below in connection with FIGS. 4 and 6, respectively.

Computing device 102 and/or server 104 can be any suitable computing device or combination of devices, such as a desktop computer, a vehicle computer, a mobile computing device (e.g., a laptop computer, a smartphone, a tablet computer, a wearable computer), a server computer, a virtual machine being executed by a physical computing device, a web server, etc. Further, in some examples, there may be a plurality of computing devices 102 and/or a plurality of servers 104.

Communication network 108 can be any suitable communication network or combination of communication networks. For example, communication network 108 can include a Wi-Fi network (which can include one or more wireless routers, one or more switches, etc.), a peer-to-peer network (e.g., a Bluetooth network), a cellular network (e.g., a 3G network, a 4G network, a 5G network, complying with any suitable standard), a wired network, etc. In some examples, communication network 108 can be a local area network (LAN), a wide area network (WAN), a public network (e.g., the Internet), a private or semi-private network (e.g., a corporate or university intranet), any other suitable type of network, or any suitable combination of networks. Communication links (arrows) shown in FIG. 1 can each be any suitable communications link or combination of communication links, such as wired links, fiber optics links, Wi-Fi links, Bluetooth links, cellular links, etc.

Figure 2:
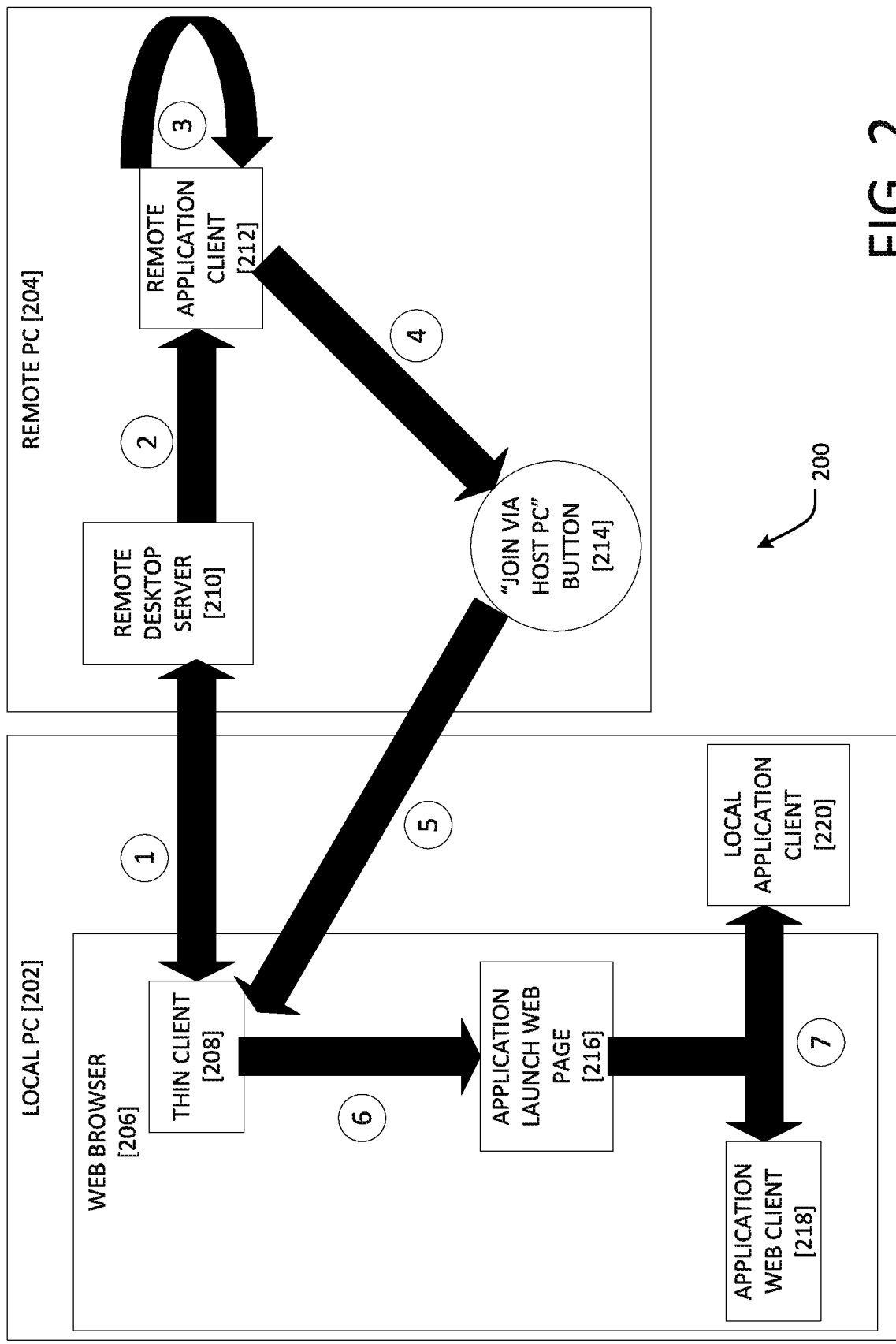
FIG. 2 illustrates an example flow for transferring an application between a remote device and a local device, according to some aspects described herein.

FIG. 2 illustrates example flow 200 for transferring an application between a server device, which in this example is a remote personal computer (PC) 204 and a local device, which, in this example is a local PC 202, according to some aspects described herein. The local PC 202 includes a web browser 206. In some examples, the local PC 202 may be similar to the computing device 102 described earlier herein with respect to FIG. 1. Further, in some examples, the remote PC 204 may be similar to the server 104 described earlier herein with respect to FIG. 1. The web browser 206 may be any type of web browser recognized by those of ordinary skill in the art.

It is noted that while specific steps of the flow 200 are described below with respect to sequential values such as "1", "2", "3", etc., as shown in circles on FIG. 2, it should be recognized by those of ordinary skill in the art that such steps may be implemented in a different order than the order described herein, such as, for example, a non-sequential order. Further, in some examples, multiple steps may be implemented in parallel, as opposed to sequential to one another.

At step 1 in the flow 200, a remote desktop protocol (RDP) session is created between a thin client 208 and a remote desktop server 210 located on the remote PC 204. In some examples, the thin client 208 is a computer application that runs from resources stored on a central server instead of a localized hard drive. Thin clients, such as thin client 206, may work by connecting remotely to a server-based computing environment, such as the remote desktop server 210, where most applications, data, and memory, are stored.

At step 2 in the flow 200, an application is launched or opened on the server. The application may be opened via a remote application client 212. The application may be a videoconferencing application, a teleconferencing application, a video streaming application, and/or an application that is configured to be executed within a web browser and that may be recognized by those of ordinary skill in the art.

At step 3 in the flow 200, it may be determined that the launched application may be executed on the local PC 202 (e.g., instead of on the remote PC 204). For example, the remote PC 204, the particular remote application, and/or the remote desktop server 210 may generate a key, which is indicative that the application may be executed on the local device. The key may be an indicator, a flag, or another type of data that is created by the remote PC 204 on which the remote desktop server 210 is running.

At step 4 in the flow 200, a transfer control option or indication 214 is displayed that corresponds to transferring the application from the server to the client. In some examples, the transfer control option 214 is a button displayed via a graphical user interface. The button 214 may include a message that states "JOIN VIA HOST PC." Additionally, or alternatively the button 214 may include a different message that is indicative to a user of an option to implement mechanisms described herein to transfer an application from the remote PC 204 to the local PC 202. In some examples, the transfer control option 214 may be selectable (e.g., by a user or system).

At step 5 in the flow 200, a link is sent from the remote PC 204 to the local PC 202. In some examples, the link may be sent in response to a selection of the transfer control option 214. The link corresponds to the application. For example, the link may be a link to a website, a videoconferencing meeting, or a teleconferencing meeting, etc. The link may be sent via a virtual channel, such as a dynamic virtual channel (DVC). Generally, virtual channels are bi-directional connection streams provided through a remote desktop protocol. Virtual channels allow parties to establish a data pipe between client (e.g., local PC 202) and server (e.g., remote PC 204) to extend the functionality of an RDP, such as the RDP created in step 1.

DVC application programming interfaces (APIs) can include client APIs and server APIs. The DVC APIs can extend existing virtual channel APIs for remote desktop services, known as static virtual channel (SVC) APIs. DVC APIs address several limitations that may have existed in SVC APIs between the client and server, such as a limited number of channels and packet reconstruction. Additional and/or alternative advantages of using a dynamic virtual channel to send the link will be recognized by those of ordinary skill in the art.

At step 6 in the flow 200, the link is activated to execute the application within a browser of the client. For example, a user-input may be received corresponding to a selection of the link. Additionally, or alternatively, in some examples, the application may be automatically executed, based on receiving the link. In some examples, activating the link may prompt a graphical user-interface to be generated, such as a launch page 216 for the application. The launch page 216 for the application may provide at least two different options for executing the application, such as, for example, executing the application within a web client on the local PC or within a local client on the local PC.

At step 7 in the flow 200, the application is executed within at least one of a web client 218 or a local client 220 on the local PC 202. By executing the application on the web client 202 (e.g., via the web browser 206), the application may be processed using at least one processor of the local PC 202 that corresponds to the web browser 206. Further, the application may be processed using an allocated region of memory of the local PC 202 that corresponds to operations associated with the web browser 206. Comparatively, by executing the application on the local application client 220, the application may be processed using at least one processor of the local PC 202 that corresponds to the local client 220. Further, the application may be processed using an allocated region of memory of the local PC 202 that corresponds to operations associated with the local client 220.

Generally, the flow 200 provides for improved user efficiency for fluidly transferring an application from a server environment to a local device. Further, transferring an application between a server environment and a local device, as described in flow 200, can improve computational efficiency, by offloading tasks that are relatively computationally intensive (e.g., requiring a large amount of processing power and/or memory) onto a local device, which has a separate processor and memory from a remote device on which the server environment is being executed.

Figure 3:
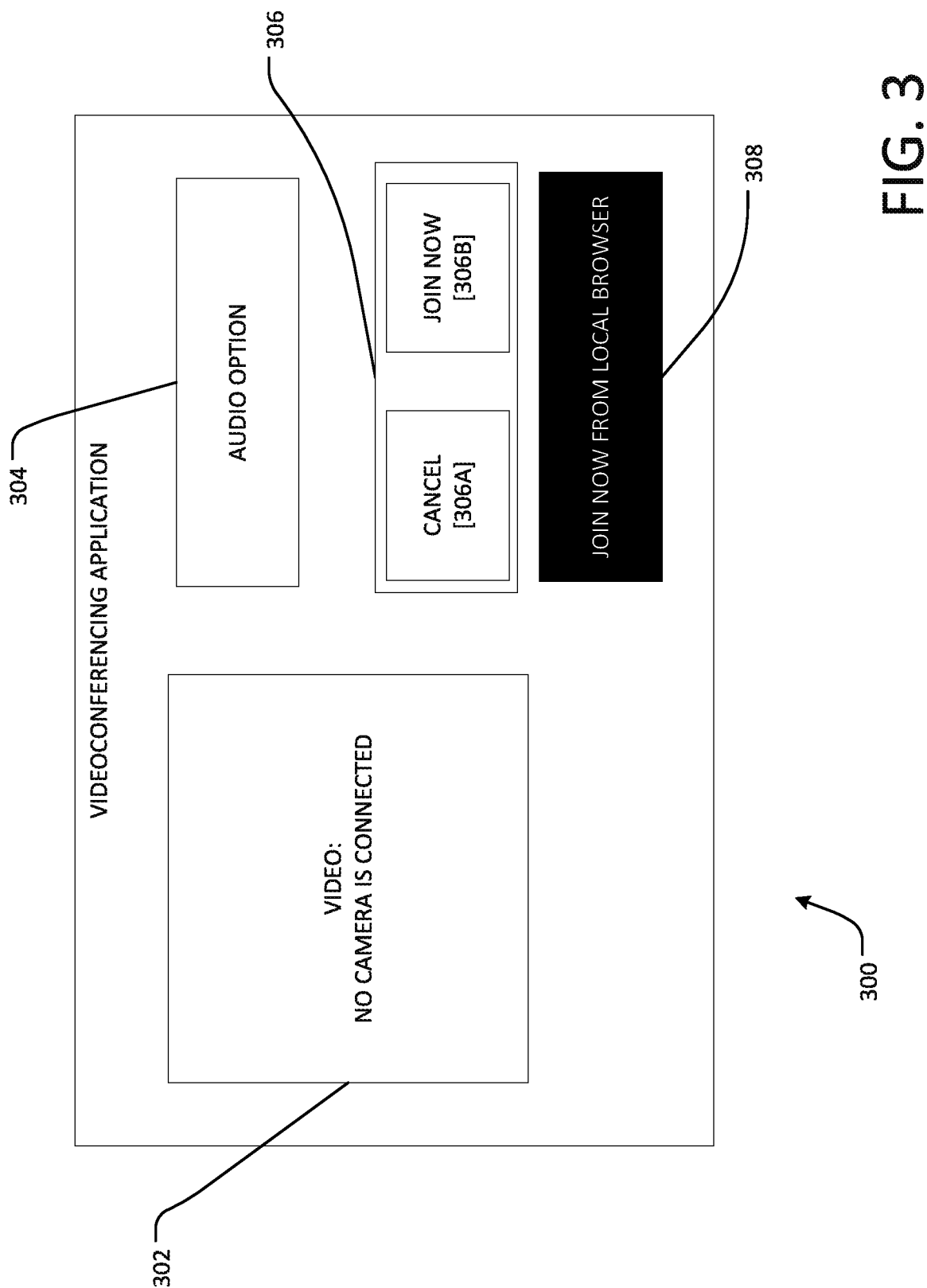
FIG. 3 illustrates an example graphical user-interface, according to some aspects described herein.

FIG. 3 illustrates an example graphical user-interface (GUI) 300, according to some aspects described herein. The example GUI 300 is a GUI for a videoconferencing application. The GUI 300 includes a first portion 302 that corresponds to a video feed, a second portion 304 that corresponds to an audio option, a third portion 306 that corresponds to entering or cancelling a video call, and a fourth portion 308 that corresponds to an indication for transferring an application between a server environment and a local device.

In some examples, the GUI 300 is generated by a server environment (e.g., on a virtual desktop, within a virtual machine). The server environment may not have certain types of hardware, such as a camera and/or a microphone. Accordingly, the first portion 302 may provide an indication to a user that a camera is not connected. Additionally, or alternatively, in some examples, the first portion 302 may include a preview of a video feed from an image sensor (e.g., a camera into which a user is looking).

In some examples, the second portion 304 includes a plurality of audio options for a user to join a meeting, with audio. For example, the second portion 304 may include a plurality of indications from which a user may select to join a meeting via an auxiliary microphone, a microphone within a device, a telephone, etc. In some examples, the second portion 304 may include whether a user is joining a meeting with a microphone, whether the microphone is on, whether the microphone is muted, etc.

The third portion 306 may include a first button 306A for cancelling or exiting the videoconferencing application, thereby terminating an execution of the video conferencing application. Additionally, or alternatively, the third portion 306 may include a second button 306B for joining a call or meeting, via the videoconferencing application. A user may select the first button 306A or the second button 306B via a user input, such as a stroke of a key, a click of a mouse, a gaze into a gaze sensor, a touch on a touchpad, a gesture, a voice command, etc.

The fourth portion 308 corresponds to an indication for transferring an application between a server environment and a local device. The fourth portion 308 may include a transfer control option, similar to the transfer control option 214 described earlier herein with respect to FIG. 2. For example, the transfer control option of the fourth portion 308 may be a button that is generated and/or displayed to a user, by determining that an application associated with the GUI 300 may be executed on a local device (e.g., instead of in a server environment). Mechanisms described herein for transferring the application from the server environment to a local device may be implemented in response to receiving an indication corresponding to a selection of the fourth portion 308 (e.g., via a user input).

Figure 4:
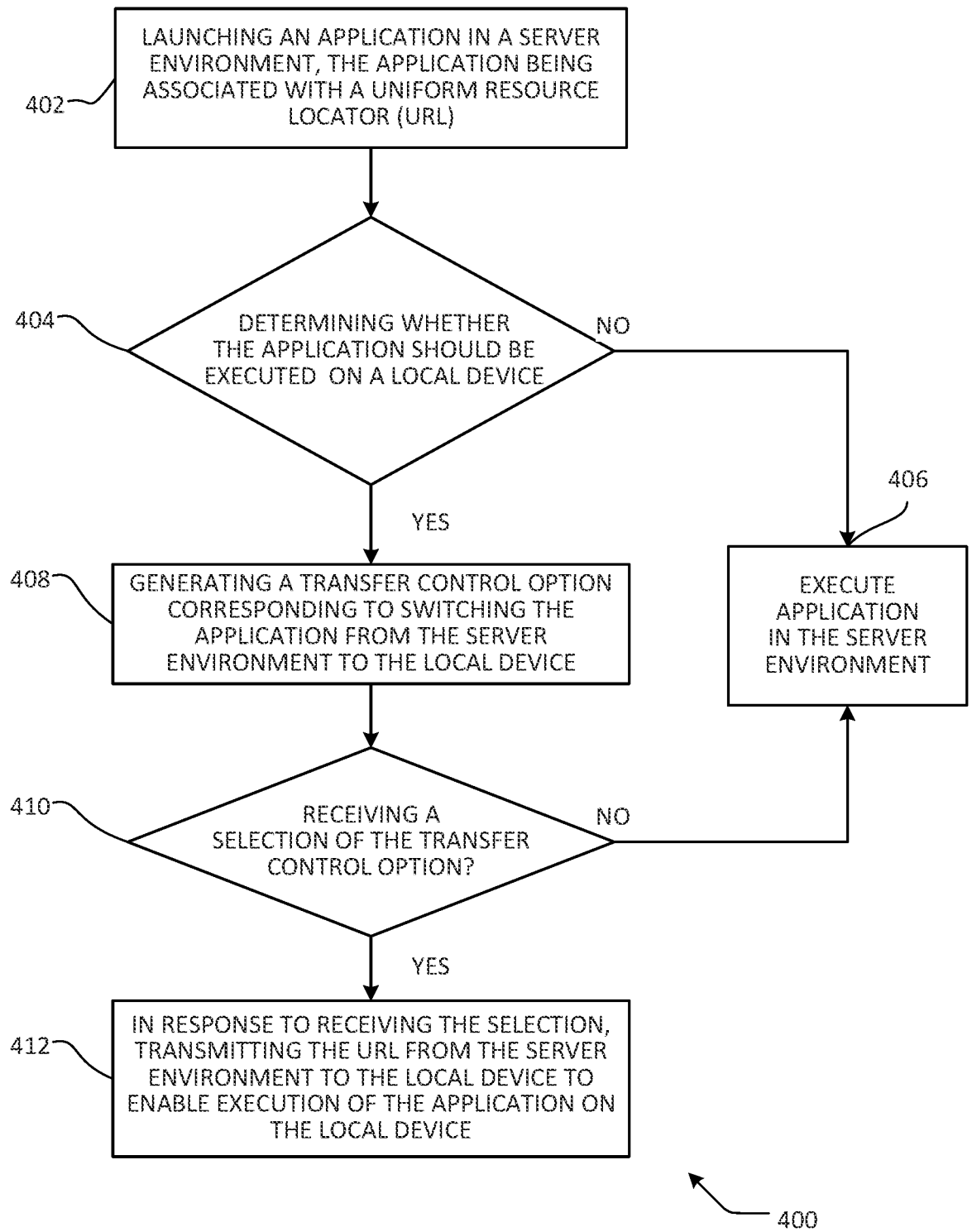
FIG. 4 illustrates an example method for transferring an application between a server environment and a local device, according to some aspects described herein.

FIG. 4 illustrates an example method for transferring an application between a server environment and a local device, according to some aspects described herein. In examples, aspects of method 400 are performed by a device, such as computing device 102 and/or server 104, discussed above with respect to FIG. 1.

Method 400 begins at operation 402 wherein an application is launched. For example, the application may be launched in a server environment (e.g., associated with the server device 104). The application is associated with a uniform resource identifier (URI), such as a URL. The application may be a videoconferencing application, a teleconferencing application, a video streaming application, a web-browsing application, or another type of application that may be recognized by those of ordinary skill of the art for which mechanisms provided herein may be applicable.

At operation 404 it is determined whether the application should be executed on a local device, such as instead of the server environment. For example, the determining may include receiving a key that indicates that the application is capable of launching on the local device. The key may be an indicator, a flag, or any other type of data created by a server device, on which the server environment is running, to indicate that the application should be executed on a local device. Alternative techniques for determining if an application is running in the server environment may be recognized by those of ordinary skill in the art.

In some examples, operation 404 includes comparing hardware and/or processing capabilities associated with the local device to hardware and/or processing capabilities associated with the server device. If the local device includes hardware that is preferable for running the application, with respect to the server device, then it may be determined that the application should be executed on the local device. For example, the local device may include a discrete or integrated GPU (e.g., in addition to a CPU) which can run encoding and/or decoding operations, while the service device may have only a CPU (e.g., without a GPU). In such examples, it may therefore be preferable to run the application on the local device, as compared to the server device based on preferred hardware and/or processing capabilities of the local device.

Further, in some examples, the local device may include a relatively larger number of processing devices (e.g., CPUs) than the server device. Additionally and/or alternatively, the local device may include processing devices that are relatively more efficient than processing devices on the server device. In such examples, it may therefore be preferable to run the application on the local device, as compared to the server device, such as to improve efficiency of codec operations (e.g., encoding and/or decoding) according to some aspects described herein.

In some examples in accordance with aspects described herein, such as examples that include videoconferencing application, the server environment may decode a data stream (e.g., of audio and/or video), reencode the data stream, and then have a web client decode the data stream again, and then reencode the data stream again to send it back to a client. Comparatively, when it is determined at operation 414 that the application should be executed on the local device, and the videoconferencing application is subsequently transferred to the local device, the data stream (e.g., of audio and/or video) may only have to be decoded and/or reencoded a single time, thereby improving computational efficiency (e.g., by requiring less processing power and/or memory to decode and reencode data streams).

If it is determined that the application should not be executed on the local device, flow branches "NO" to operation 406, where the application is executed in the server environment. For example, the application may be specific to the server device and not have an associated application on the local device. Additionally, or alternatively, the application may not be associated with a URL that is capable of being transferred to the local device. Additionally, or alternatively, in some examples a key indicating that the application is capable of launching on the local device may not be received, such as when the application is launched in the server environment. Additionally, or alternatively, the server device may have preferable or the same hardware as the local device. Additionally, or alternatively, the server device may have preferable or the same processing capabilities as the local device. Method 400 may terminate at operation 406.

If, however, it is determined that the application should be executed on the local device, flow instead branches "YES" to operation 408, where, in response to determining that the application should be executed on the local device, a transfer control option is generated that corresponds to switching the application from the server environment to the local device. In some examples, the transfer control option is similar to the transfer control option 214 described with respect to FIG. 2 and/or the transfer control option 308 described with respect to FIG. 3. For example, the transfer control option may be a button (e.g., that is displayed on a graphical user-interface). The button may be configured to be selectable by a user (e.g., via a user input).

At operation 410, it is determined if a selection of the transfer control option is received. For example, a user may choose whether or not to switch an application from the server environment to the local device. In some examples, a user may select the transfer control option (e.g., the button), via user-input. The user-input may include a stroke of a key, a click of a mouse, a gaze into a gaze sensor, a touch on a touchpad, a gesture, a voice command, or any other user-input that may be recognized by those of ordinary skill in the art.

If it is determined that the selection of the transfer control option was not received, flow branches "NO" to operation 406, where the application is executed in the server environment. For example, a user may prefer to run the application in the server environment, despite benefits described herein that may be available for choosing to transfer execution of the application to resources (e.g., a processor and/or memory) of the local device. Method 400 may terminate at operation 406.

If, however, a selection of the transfer control option is received, flow instead branches "YES" to operation 412, where, in response to receiving the selection, the URL associated with the application is transmitted from the server device to the local device to enable execution of the application on the local device. The URL may be a link to a website, a videoconferencing meeting, a teleconferencing meeting, or another type of application that may be recognized by those of ordinary skill in the art. Further, the URL may be transmitted from the server device to the local device, via a dynamic virtual channel. Method 400 may terminate at operation 412.

In some examples, enabling execution of the application on the local device, at operation 412, is based on the transmitted URL. For example, the application may be executed in the form of a web client (e.g., via web browser 206, discussed with respect to FIG. 2). Additionally, or alternatively, the application may be executed in the form of a local application client. In some examples, the application may be executed on the local device instead of in the server environment. Therefore, when the link associated with the application is transmitted from the server device to the local device, the application may automatically be terminated on the server device (e.g., in the server environment). Additionally, or alternatively, when execution of the application is enabled on the local device, at operation 412, the application may then automatically be terminated on the server device.

When the application is launching in the server environment (e.g., at operation 402), the application is being launched by a first processor, and when the application is executing on the local device (e.g., after execution is enabled at operation 412), the application is being executed on a second processor, which is different than the first processor.

In some examples, the application may be launched (e.g., at operation 402) in a first tab of a browsing application. For example, the first tab may display (e.g., on a display screen of a local device), the server environment in which the application (e.g., a server-version of the application) is launched. When execution of the application is enabled on the local device (e.g., at operation 412), a second tab of the browsing application may execute a local version of the application that was transferred from the server environment. The first and second tabs may be generated by the same browsing application. Such examples provide for an efficient, easy, and/or fluid transfer of an application from a server environment to a local device (e.g., via different tabs of the same browsing application). Additional and/or alternative advantages will be recognized by those of ordinary skill in the art, at least in light of teachings provided herein.

Generally, the method 400 provides for improved user efficiency for fluidly transferring an application from a server environment to a local device, when determining that an application launched in the server environment may be executed on a local device. Further, transferring an application between a server environment and a local device, as described in method 400, can improve computational efficiency, by offloading tasks that are relatively computationally intensive (e.g., requiring a large amount of processing power and/or memory) onto a local device, which has a separate processor and memory from a remote device on which the server environment is being executed.

Figure 5:
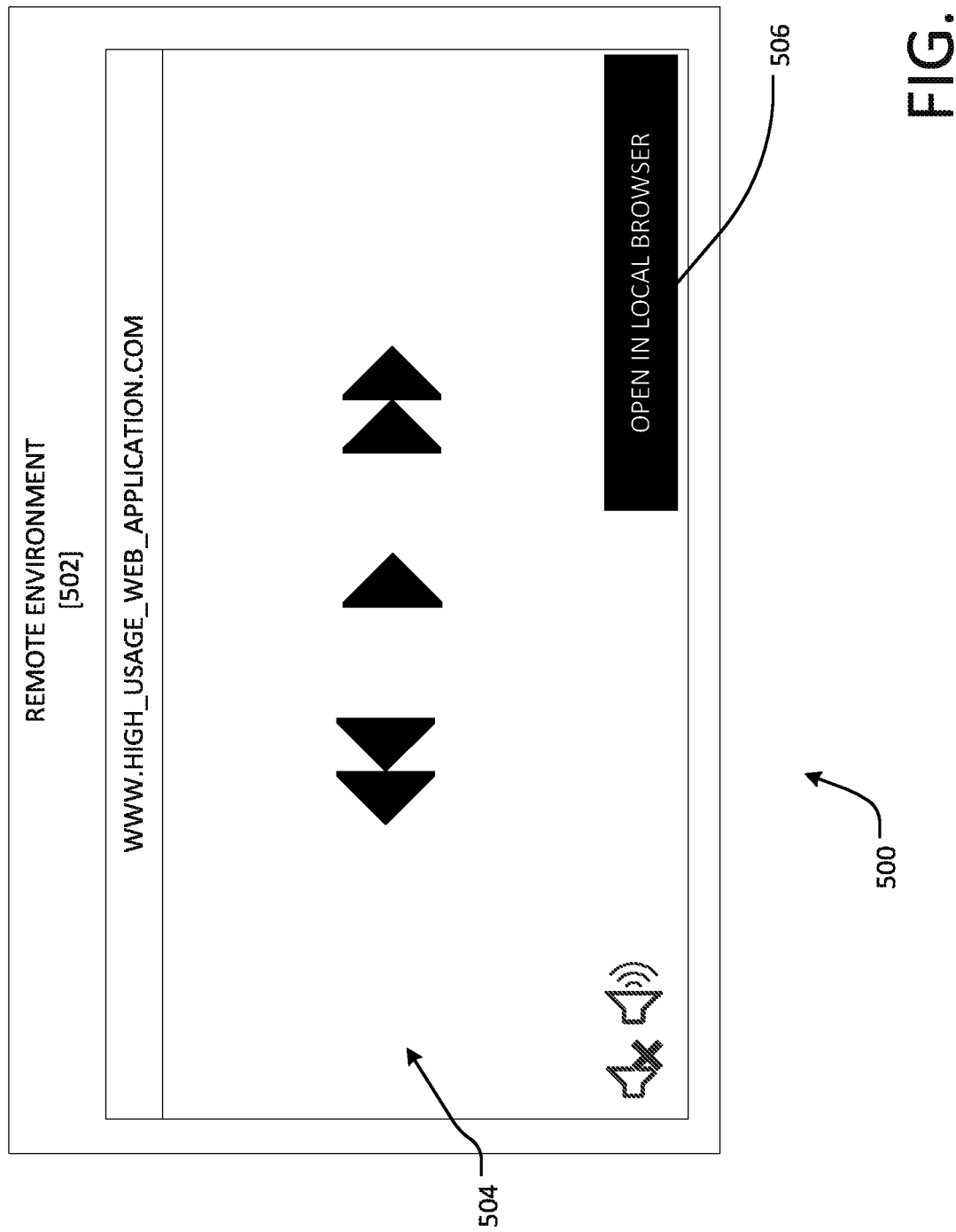
FIG. 5 illustrates an example graphical user-interface, according to some aspects described herein.

FIG. 5 illustrates an example GUI 500, according to some aspects described herein. The GUI 500 is a GUI for a remote environment 502. The remote environment 502 includes a web application 504. In some examples, the web application 504 is a high usage web application. For example, the web application 504 may be a video streaming application.

Mechanisms described herein may determine that a usage level of the web application 504 exceeds a predetermined threshold. For example, the usage level may correspond to at least one of a memory usage level or a processor usage level. Those of ordinary skill in the art will recognize that some video streaming applications may be relatively high usage in that they demand a relatively large amount of memory and/or processing power to generate high-quality videos.

The memory usage level may be calculated by comparing a current usage level of memory of a server device (e.g., on which the remote environment 502 is operating) to an available usage level of memory on the server device. The available usage level may be a predetermined threshold defined by hardware and/or software associated with the memory on the server device. Similarly, the processor usage level may be calculated by comparing a current usage level of processor power on the server device to an available usage level of processor power on the server device. The available usage level may be a predetermined threshold defined by hardware and/or software associated with one or more processors on the server device).

In response to determining that the usage level of the web application 504 exceeds a predetermined threshold, an indication or transfer control option 506 may be generated. The transfer control option 506 may be a button that a user can select (e.g., via user input) to transfer the web application 504 from the remote environment 502 to a local device.

Figure 6:
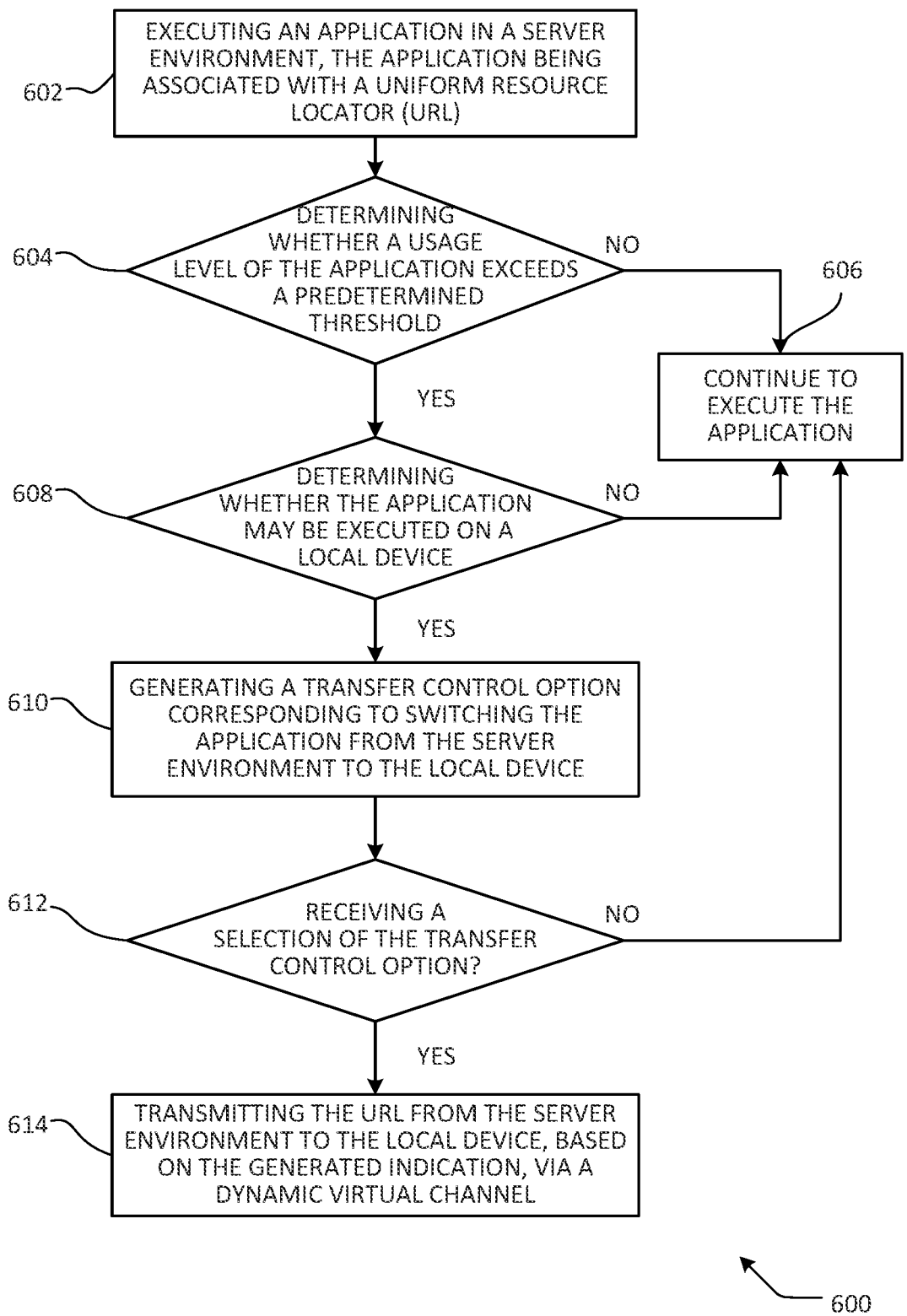
FIG. 6 illustrates an example method for transferring an application between a server environment and a local device, according to some aspects described herein.

FIG. 6 illustrates an example method for transferring an application between a server environment and a local device, according to some aspects described herein. In examples, aspects of method 600 are performed by a device, such as computing device 102 and/or server 104, discussed above with respect to FIG. 1.

Method 600 begins at operation 602 wherein an application is executed. For example, the application may be executed in a server environment (e.g., associated with the server device 104). Additionally, or alternatively, the application may be executed on a local device (e.g., similar to computing device 102). The application is associated with a URI, such as a URL. The application may be a videoconferencing application, a teleconferencing application, a video streaming application, a web-browsing application, or another type of application that may be recognized by those of ordinary skill of the art for which mechanisms provided herein may be applicable.

At operation 604 it is determined whether a usage level of the application exceeds a predetermined threshold. For example, the usage level may correspond to at least one of a memory usage level or a processor usage level. The memory usage level may be calculated by comparing a current usage level of memory on the server device to an available usage level of memory on the server device (e.g., a predetermined threshold defined by hardware and/or software associated with the memory on the server device). Similarly, the processor usage level may be calculated by comparing a current usage level of processor power on the server device to an available usage level of processor power on the server device (e.g., a predetermined threshold defined by hardware and/or software associated with one or more processors on the server device).

Generally, operation 604 determines if an application is considered to be relatively high usage, and whether the application should be offloaded to a local device. For example, a local device may be more computationally efficient. Additionally, or alternatively, transferring an application to a local device may entail fewer data transmission between independent devices, thereby reducing computational resources spent on transmitting data between devices (e.g., video encodings between devices).

Further, server devices (e.g., that include a server environment) may not have a GPU attached, which means that the server device is likely to have relatively inefficient software decoders and/or encoders. However, a client or local device is likely to have some form of hardware decoding and/or encoding available. For example, in some examples the client device may have a discrete or integrated GPU which can run encoding and/or decoding operations. Therefore, executing operations (e.g., encoding, decoding, and/or other operations) may be more efficiently executed on a device, such as a local device, that has a GPU, for example, as opposed to a device that has a CPU, without a GPU.

If it is determined that a usage level of the application does not exceed a predetermined threshold, flow branches "NO" to operation 606, where the application may continue to execute in the server environment. For example, if the application does not exceed the predetermined threshold for computational usage, then it may not be necessary and/or desirable to transfer the application to a local device.

If, however, it is determined that the usage level of the application does exceed the predetermined threshold, flow instead branches "YES" to operation 608, where it is determined whether the application may be executed on a local device, such as instead of the server environment. For example, the determining may include receiving a key that indicates that the application is capable of launching on the local device. The key may be an indicator, a flag, or any other type of data created by a server device, on which the server environment is running, to indicate that the application may be executed on a local device. Alternative techniques for determining if an application is running in the server environment and/or may be executed on the local device may be recognized by those of ordinary skill in the art.

If it is determined that the application may not be executed on the local device, flow branches "NO" to operation 606, where the application continues to be executed in the server environment. For example, the application may be specific to the server device and not have an associated application on the local device. Additionally, or alternatively, the application may not be associated with a URL that is capable of being transferred to the local device. Additionally, or alternatively, in some examples a key indicating that the application is capable of launching on the local device may not be received, such as when the application is launched in the server environment. Method 600 may terminate at operation 606.

If, however, it is determined that the application may be executed on the local device, flow instead branches "YES" to operation 610, where, in response to determining that the application may be executed on the local device, a transfer control option is generated that corresponds to switching the application from the server environment to the local device. In some examples, the transfer control option is similar to the transfer control option 214 described with respect to FIG. 2 and/or the transfer control option 308 described with respect to FIG. 3. For example, the transfer control option may be a button (e.g., that is displayed on a graphical user-interface). The button may be configured to be selectable by a user (e.g., via a user input).

At operation 612, it is determined if a selection of the transfer control option is received. For example, a user may choose whether or not to switch an application from the server environment to the local device. In some examples, a user may select the transfer control option (e.g., the button), via user-input. The user-input may include a stroke of a key, a click of a mouse, a gaze into a gaze sensor, a touch on a touchpad, a gesture, a voice command, or any other user-input that may be recognized by those of ordinary skill in the art.

If it is determined that the selection of the transfer control option was not received, flow branches "NO" to operation 606, where the application continues to be executed in the server environment. For example, a user may prefer to run the application in the server environment, despite benefits described herein that may be available for choosing to transfer execution of the application to resources (e.g., a processor and/or memory) of the local device. Method 600 may terminate at operation 606.

If, however, a selection of the transfer control option is received, flow instead branches "YES" to operation 614, where the URL associated with the application is transmitted from the server device to the local device to enable execution of the application on the local device. The URL may be a link to a website, a videoconferencing meeting, a teleconferencing meeting, or another type of application that may be recognized by those of ordinary skill in the art. Further, the URL may be transmitted from the server device to the local device, via a dynamic virtual channel. Method 600 may terminate at operation 614.

DVC APIs can include client APIs and server APIs. The DVC APIs can extend existing virtual channel APIs for remote desktop services, such as SVC APIs. DVC APIs address several limitations that may have existed in SVC APIs between the client and server, such as a limited number of channels and packet reconstruction. Additional and/or alternative advantages of using a dynamic virtual channel to send the link will be recognized by those of ordinary skill in the art.

In some examples, execution of the application is enabled on the local device, based on the transmitted URL. For example, the application may be executed in the form of a web client (e.g., via web browser 206, discussed with respect to FIG. 2). Additionally, or alternatively, the application may be executed in the form of a local application client. In some examples, the application may be executed on the local device instead of in the server environment. Therefore, when the link associated with the application is transmitted from the server device to the local device, the application may automatically be terminated on the server device (e.g., in the server environment). Additionally, or alternatively, when the application is executed on the local device, the application may then automatically be terminated on the server device.

When the application is running in the server environment, the application is being executed by a first processor, and when the application is running on the local device, the application is being executed on a second processor, which is different than the first processor.

In some examples in accordance with aspects described herein, such as examples that include videoconferencing application, a system may include a server environment that decodes a data stream (e.g., of audio and/or video), reencodes the data stream, and then has a web client decode the data stream again, and then reencode the data stream again to send it back to a client. Comparatively, when the videoconferencing application is transferred to a local device, the data stream (e.g., of audio and/or video) may only have to be decoded and/or reencoded a single time, thereby improving computational efficiency (e.g., by requiring less processing power and/or memory to decode and reencode data streams).

Generally, the method 600 provides for improved user efficiency for fluidly transferring an application from a server environment to a local device, when determining that the application may be executed on a local device. Further, transferring an application between a server environment and a local device, as described in method 600, can improve computational efficiency, by offloading tasks that are relatively computationally intensive (e.g., requiring a large amount of processing power and/or memory) onto a local device, which has a separate processor and memory from a remote device on which the server environment is being executed.

FIGS. 7-11 and the associated descriptions provide a discussion of a variety of operating environments in which aspects of the disclosure may be practiced. However, the devices and systems illustrated and discussed with respect to FIGS. 7-11 are for purposes of example and illustration and are not limiting of a vast number of computing device configurations that may be utilized for practicing aspects of the disclosure, described herein.

Figure 7:
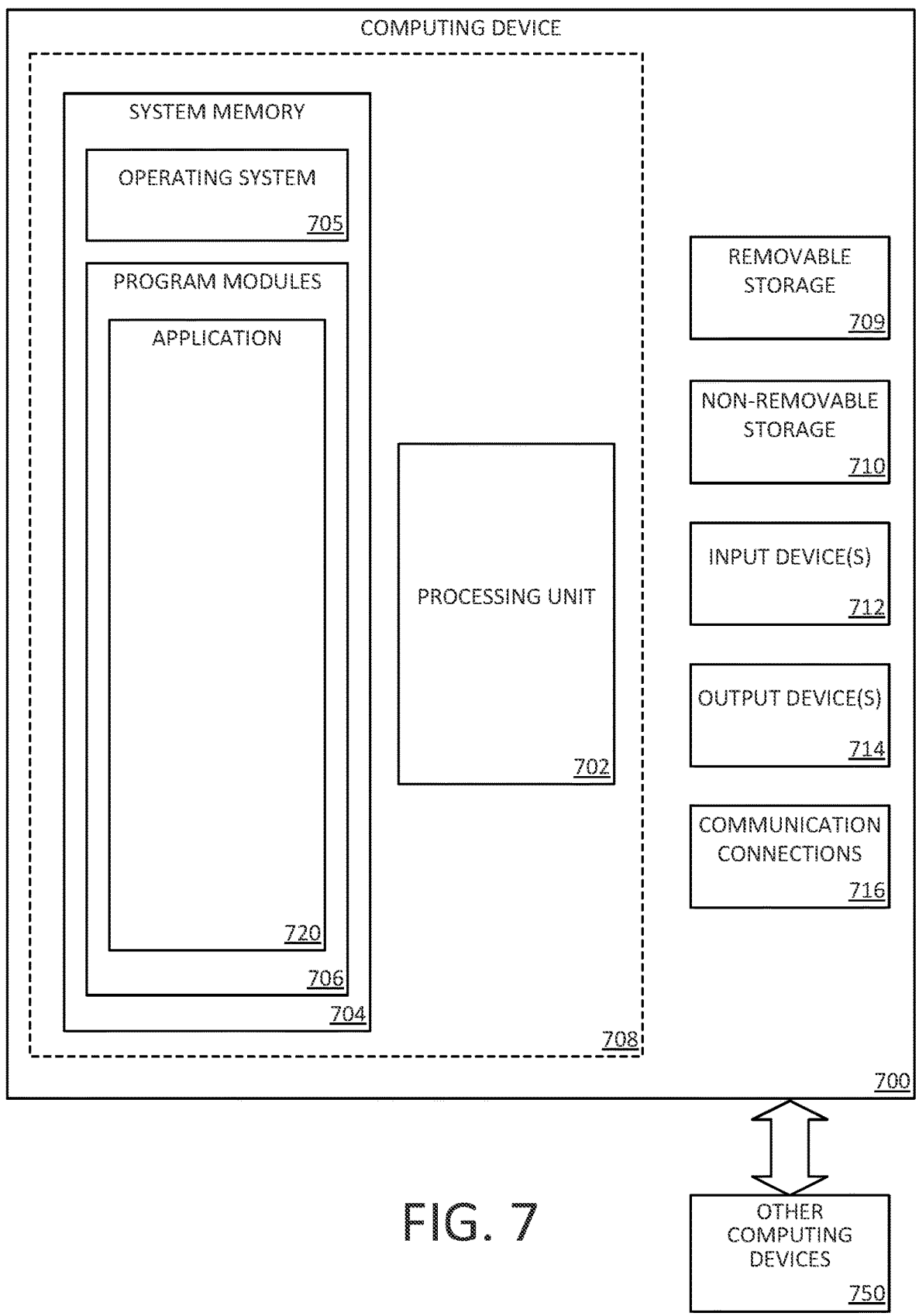
FIG. 7 illustrates a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above, including computing device 102 in FIG. 1. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories.

The system memory 704 may include an operating system 705 and one or more program modules 706 suitable for running software application 720, such as one or more components supported by the systems described herein. The operating system 705, for example, may be suitable for controlling the operation of the computing device 700.

Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., application 720) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Some aspects of the disclosure may also be practiced using other technologies capable of performing logical operations such as, for example, AND, OR, and NOT, including but not limited to mechanical, optical, fluidic, and quantum technologies. In addition, some aspects of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
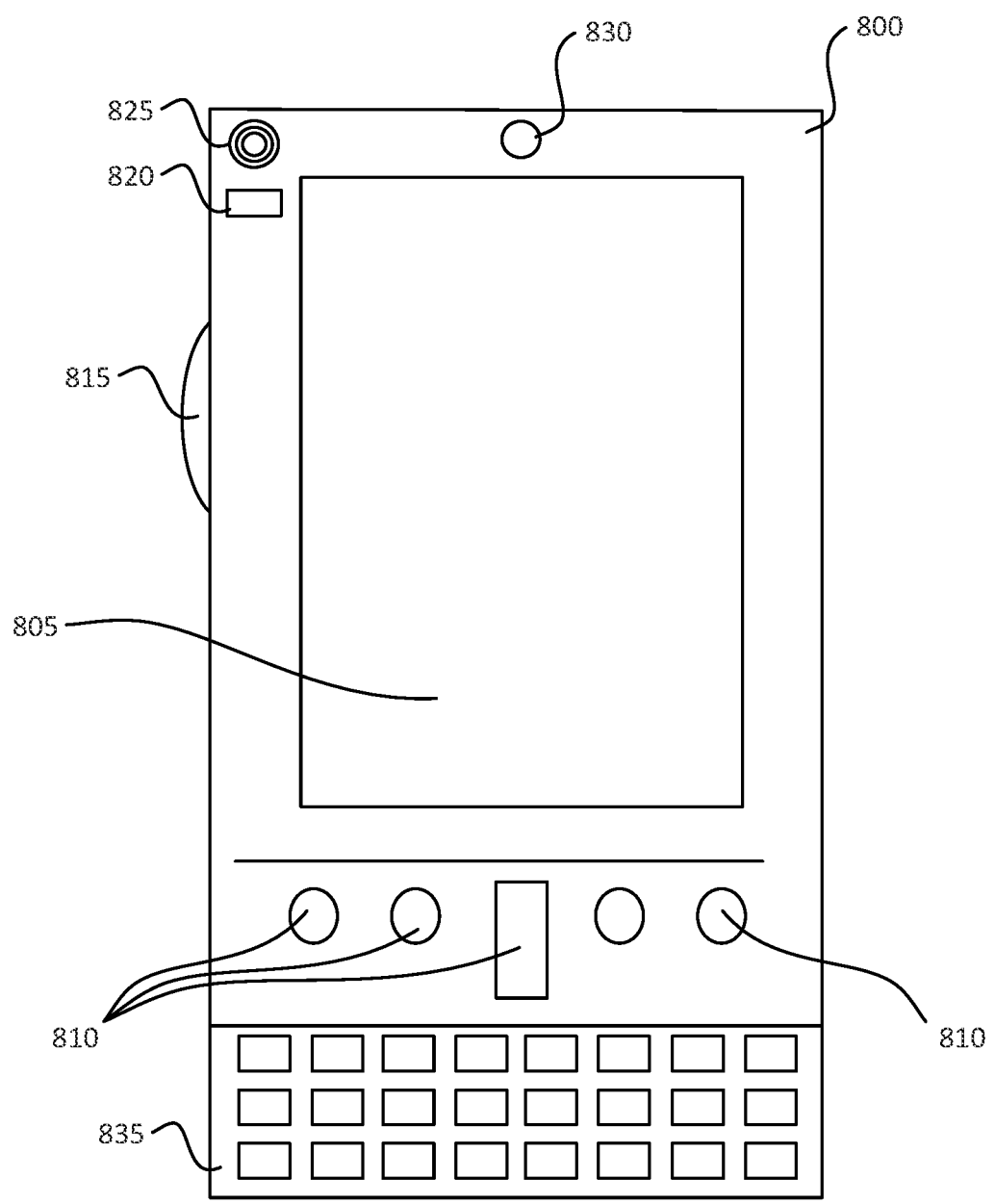
FIGS. 8A and 8B are simplified block diagrams of a mobile computing device with which aspects of the present disclosure may be practiced.
Figure 8B:
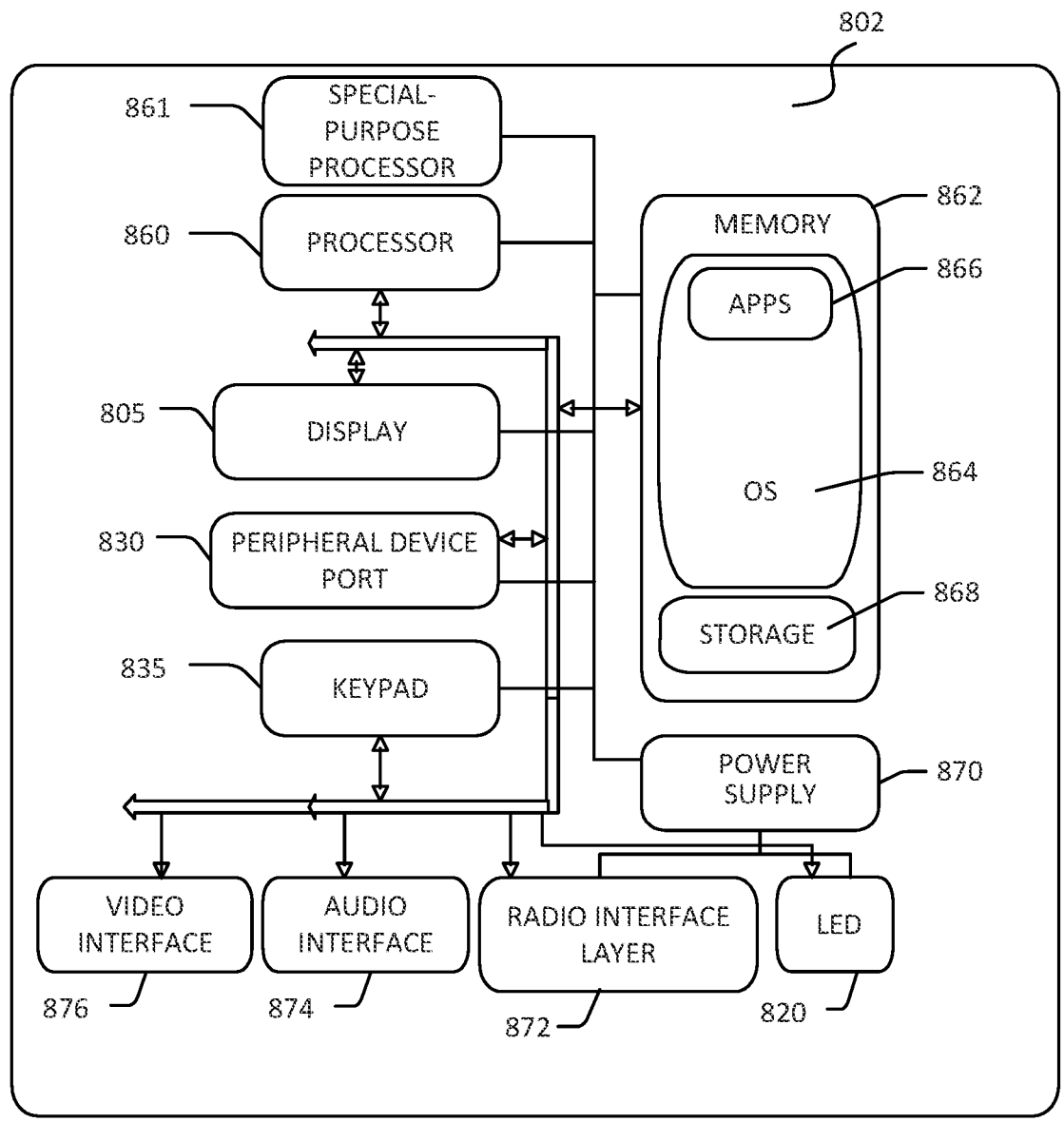

FIGS. 8A and 8B illustrate a mobile computing device 800, for example, a mobile telephone, a smart phone, wearable computer (such as a smart watch), a tablet computer, a laptop computer, and the like, with which some aspects of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The one or more input buttons 810 may be "soft" buttons that are generated on the touch screen display. The display 805 of the mobile computing device 800 may also function as an input device (e.g., a touch screen display).

If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some examples.

In yet another alternative example, the mobile computing device 800 is a portable phone system, such as a cellular phone. The mobile computing device 800 may also include an optional keypad 835. Optional keypad 835 may be a physical keypad or a "soft" keypad generated on the touch screen display.

In various examples, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In some examples, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated example, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and/or special-purpose processor 861 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Figure 9:
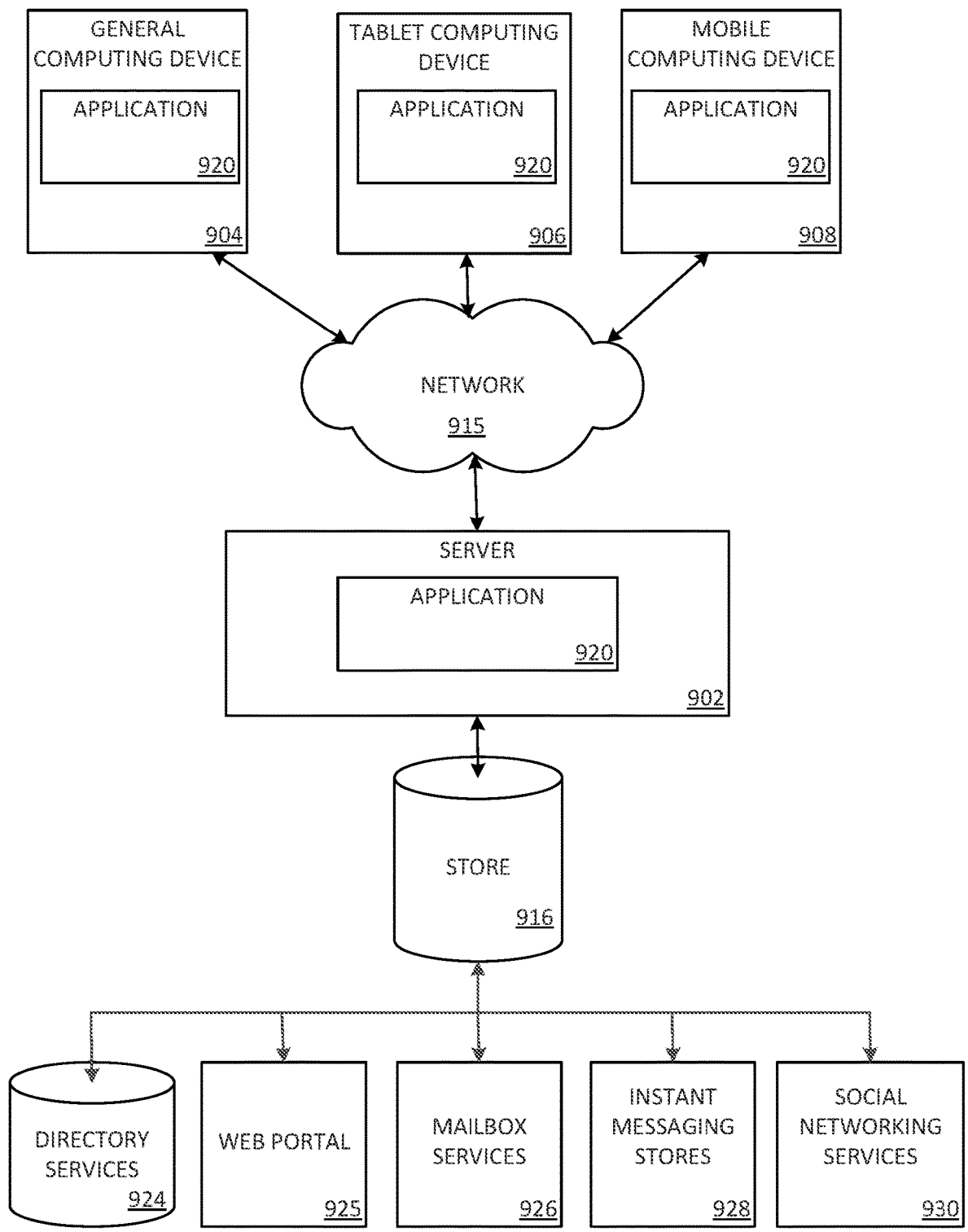
FIG. 9 is a simplified block diagram of a distributed computing system in which aspects of the present disclosure may be practiced.

FIG. 9 illustrates one aspect of the architecture of a system for processing data received at a computing system from a remote source, such as a personal computer 904, tablet computing device 906, or mobile computing device 908, as described above. Content displayed at server device 902 may be stored in different communication channels or other storage types. For example, various documents may be stored using a directory service 924, a web portal 925, a mailbox service 926, an instant messaging store 928, or a social networking site 930.

An application 920 (e.g., similar to the application 720) may be employed by a client that communicates with server device 902. Additionally, or alternatively, the application 920 may be employed by server device 902. The server device 902 may provide data to and from a client computing device such as a personal computer 904, a tablet computing device 906 and/or a mobile computing device 908 (e.g., a smart phone) through a network 915. By way of example, the computer system described above may be embodied in a personal computer 904, a tablet computing device 906 and/or a mobile computing device 908 (e.g., a smart phone). Any of these examples of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for transferring an application between a server environment and a local device, the method comprising:
    launching the application in the server environment, the application being associated with a uniform resource location (URL);
    determining that the application should be executed on the local device;
    generating a transfer control option corresponding to switching the application from the server environment to the local device;
    displaying the transfer control option via a first tab of a browser;
    receiving a selection of the transfer control option; and
    in response to receiving the selection, transmitting the URL from the server environment to the local device to enable execution of the application on the local device, via a second tab of the browser.

2. The method of claim 1, wherein the server environment is a remote desktop session on a virtual machine.

3. The method of claim 1, wherein the URL is transmitted from the server environment to the local device, via a dynamic virtual channel.

4. The method of claim 1, wherein the determining comprises receiving a key indicating that the application is capable of launching on the local device.

5. The method of claim 1, wherein the application is a videoconferencing application.

6. The method of claim 1, wherein the transfer control option is a button, and wherein the selection corresponds to a selection of the button.

7. The method of claim 1, wherein when the application is launching in the server environment, the application is being launched by a first processor, and wherein when the application is executed on the local device, the application is being executed by a second processor.

8. A system for transferring an application between a server environment and a local device, the system comprising:
    a server device, the server device comprising a processor;
    memory storing instructions that when executed by the processor cause the system to perform a set of operations, the set of operations comprising:
        launching the application in the server environment, the application being associated with a uniform resource locator (URL);
        determining that the application should be executed on the local device;
        generating a transfer control option corresponding to switching the application from the server environment to the local device;
        displaying the transfer control option via a first tab of a browser;
        receiving a selection of the transfer control option; and
        in response to receiving the selection, transmitting the URL from the server environment to the local device to enable execution of the application on the local device, via a second tab of the browser.

9. The system of claim 8, wherein the server environment is a remote desktop session on a virtual machine.

10. The system of claim 8, wherein the URL is transmitted from the server environment to the local device, via a dynamic virtual channel.

11. The system of claim 8, wherein the determining comprises receiving a key from the server device indicating that the application is capable of launching on the local device.

12. The system of claim 8, wherein the application is a videoconferencing application.

13. The system of claim 8, wherein the transfer control option is a button, and wherein the selection corresponds to a selection of the button.

14. A method for transferring an application between a server environment and a local device, the method comprising:
    executing the application in the server environment, the application being associated with a uniform resource locator (URL);
    determining that a usage level of the application exceeds a predetermined threshold;
    determining that the application may be executed on the local device based on the application being associated with the URL;
    generating a transfer control option corresponding to switching the application from the server environment to the local device;
    displaying the transfer control option via a first tab of a browser; and
    transmitting the URL from the server device to the local device, based on the generated transfer control option, via a dynamic virtual channel, to enable execution of the application on the local device, via a second tab of the browser.

15. The method of claim 14, wherein the usage level corresponds to at least one of a memory usage level or a processor usage level.

16. The method of claim 14, wherein the server environment is a remote desktop session on a virtual machine.

17. The method of claim 14, wherein the determining comprises receiving a key indicating that the application is capable of launching on the local device.

18. The method of claim 14, wherein the application is a browser application.

19. The method of claim 14, wherein the transfer control option is a button, and the method further comprises receiving a selection of the button, the transmitting being in response to receiving the selection.

20. The method of claim 14, wherein when the application is executed in the server environment, the application is being executed by a first processor, and wherein when the application is executed on the local device, the application is being executed by a second processor.

* * * * *